US012811924B2

(12) United States Patent
Lee et al.

(10) Patent No.: US 12,811,924 B2
(45) Date of Patent: Nov. 24, 2026

(54) METHOD AND APPARATUS FOR PROVIDING USER PROFILE

(71) Applicant: KAKAO CORP., Jeju-si (KR)

(72) Inventors: Eun Hye Lee, Seongnam-si (KR); Chun Ho Kim, Seongnam-si (KR); Ji Hwi Park, Seongnam-si (KR); Hyo Jin Ham, Seongnam-si (KR); Woo Young Park, Seongnam-si (KR); Myung Jun Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 17 days.

(21) Appl. No.: 19/187,953

(22) Filed: Apr. 23, 2025

(65) Prior Publication Data

US 2025/0254154 A1 Aug. 7, 2025

Related U.S. Application Data

(63) Continuation of application No. 17/547,239, filed on Dec. 10, 2021, now abandoned.

(30) Foreign Application Priority Data

Dec. 10, 2020 (KR) ........................ 10-2020-0172774

(51) Int. Cl.
*G06F 15/16* (2006.01)
*H04L 9/40* (2022.01)
(Continued)

(52) U.S. Cl.
CPC .............. *H04L 63/08* (2013.01); *H04L 51/52* (2022.05); *H04L 67/306* (2013.01)

(58) Field of Classification Search
CPC ........ H04L 63/08; H04L 51/52; H04L 67/306
See application file for complete search history.

(56) References Cited

U.S. PATENT DOCUMENTS

| | | | |
|---|---|---|---|
| 8,910,258 B2 | 12/2014 | Gonser et al. |
| 8,959,358 B2 | 2/2015 | Konertz et al. |

(Continued)

FOREIGN PATENT DOCUMENTS

| | | |
|---|---|---|
| CN | 109951475 A | 6/2019 |
| JP | 2002083067 A | 3/2002 |

(Continued)

OTHER PUBLICATIONS

Javier Parra-Arnau,: Pay-per-tracking: A collaborative masking model for web browsing, Information Sciences, vols. 385-386, Dec. 30, 2016.

(Continued)

*Primary Examiner* — Normin Abedin
(74) *Attorney, Agent, or Firm* — Seed Intellectual Property Law Group LLP

(57) ABSTRACT

Disclosed are a server for providing a profile and a profile providing method performed by the server. A profile providing method performed by a server according to an example embodiment includes adding an interfacing object indicating that a user account is identity-verified to a profile interface of the user account, in accordance with the user account which is identity-verified, providing the profile interface including the interfacing object to another user account, in response to a request of the profile received from another user account, checking whether another user account is identity-verified in response to a request of certificate information of the user account received from another user account, and providing the certificate information to another user account based on whether another user account is identity-verified.

20 Claims, 7 Drawing Sheets

(51) Int. Cl.
*H04L 51/52* (2022.01)
*H04L 67/306* (2022.01)

(56) References Cited

U.S. PATENT DOCUMENTS

| | | | |
|---|---|---|---|
| 10,073,958 | B2 | 9/2018 | Spence |
| 10,701,069 | B2 | 6/2020 | Caluwaert |
| 2006/0047725 | A1 | 3/2006 | Bramson |
| 2008/0305832 | A1 | 12/2008 | Greenberg |
| 2009/0320101 | A1 | 12/2009 | Doyle, III et al. |
| 2013/0019289 | A1 | 1/2013 | Gonser et al. |
| 2015/0242813 | A1 | 8/2015 | Conner et al. |
| 2015/0346987 | A1 | 12/2015 | Ren et al. |
| 2016/0080346 | A1 | 3/2016 | Kuchta et al. |
| 2016/0139791 | A1 | 5/2016 | McConnell |
| 2017/0134366 | A1 | 5/2017 | Genner et al. |
| 2019/0281050 | A1 | 9/2019 | Caluwaert |
| 2020/0052906 | A1 | 2/2020 | Cahill |

FOREIGN PATENT DOCUMENTS

| | | | |
|---|---|---|---|
| JP | 2011128775 | A | 6/2011 |
| JP | 2012208958 | A | 10/2012 |
| JP | 2013533987 | A | 8/2013 |
| JP | 2017500625 | A | 1/2017 |
| JP | WO2014128836 | A1 | 2/2017 |
| JP | 6100773 | B2 | 3/2017 |
| JP | 2017107592 | A | 6/2017 |
| JP | 2020047251 | A | 3/2020 |
| JP | 2020096244 | A | 6/2020 |
| KR | 10-1571741 | B1 | 11/2015 |
| WO | 2011136794 | A1 | 11/2011 |

OTHER PUBLICATIONS

Japanese Office Action for JP Application No. 2021-200803 mailed on Dec. 6, 2022.

Japanese Office Action for JP Application No. 2021-200803 mailed on Jun. 20, 2023.

FIG. 5A
510
Manage profile
Account
Phone number
+82 10-1234-5678
Email
aabbcc@kko.com
Manage account
Add friends
kko ID
aabbcc
QR code
Advanced setting
Use profile certificate badge
on
511

METHOD AND APPARATUS FOR PROVIDING USER PROFILE

CROSS-REFERENCE TO RELATED APPLICATIONS

This application is a continuation of U.S. patent application Ser. No. 17/547,239, filed on Dec. 10, 2021, which claims priority to Korean Patent Application No. 10-2020-0172774, filed on Dec. 10, 2020, the contents of which are hereby incorporated by reference in their entirety.

BACKGROUND

Technical Field

The following example embodiments relate to a method and an apparatus for providing a user profile, and more particularly, to a server which provides a user profile in a social networking service server or an instant messaging service and an operation method of the server.

Description of the Related Art

Recently, with the development of mobile smart devices, the use of online platform services for interaction with other users is being increased. As a representative example of the online platform services for interaction with other users, there are a social networking service (SNS) which is an online platform of creating and enhancing social relationships through communication, information sharing, and personal connection expansion between users and an instant messaging service (IMS) which is an online platform for real-time content communication between two or more users.

In the service such as SNS and IMS, a profile may be used to share personal information to identify the user, such as a name or a picture of the user, with the other users. The profile may be used in various ways as the means of expressing the user itself, but the profile includes personal information of the user so that it is necessary to prevent the profile from being imprudently exposed to other people.

BRIEF SUMMARY

Technical Solutions

According to an aspect, a user profile providing method which is performed in a server includes adding an interfacing object indicating that a user account is identity-verified to a profile interface of the user account, in accordance with the user account which is identity-verified; providing the profile interface including the interfacing object to another user account, in response to a request of the profile received from another user account; checking whether another user account is identity-verified in response to a request of certificate information of the user account received from another user account; and providing the certificate information to another user account based on whether another user account is identity-verified. The certificate information may include at least one of verified real name information and verified qualification information.

The providing of the certificate information may include: providing the certificate information to another user account when another user account is identity-verified.

The providing of the certificate information may include: limiting to provide the certificate information to another user account when another user account is not identity-verified.

The providing of the certificate information may include: activating a display function of the certificate information of the profile interface, based on a display setting of the certificate information of the user account; and displaying the certificate information through the profile interface to another user account which is identity-verified.

The profile providing method may further include: acquiring verified real name information corresponding to the user account.

The providing of the certificate information may include: displaying at least a part of the verified real name information based on a display setting of the real name information of the user account.

The profile providing method may further include: acquiring at least one verified qualification information corresponding to the user account based on the verified real name information of the user account.

The providing of the certificate information may include: displaying qualification information based on a display setting of the corresponding qualification information of the user account so as to correspond to each of at least one verified qualification information.

The acquiring of qualification information may include: receiving a request of issuing first qualification information associated with a first issuing organization from the user account; and acquiring the first qualification information corresponding to the user account from the first issuing organization, based on the verified real name information of the user account.

The request of a profile may include a request through a search based on verified qualification information included in the certificate information.

The providing of the profile interface may include: providing the profile interface to another user account, based on a search permission option set to correspond to the user account, in response to the search of another user account.

The search permission option may include: at least one of an option to allow the user account to be searched; an option which does not allow the user account to be searched; and an option which allows the user account to be searched only by an account related to the user account.

The interfacing object may be displayed through the profile interface in the form of a visual mark.

The interfacing object may be displayed through the profile interface in the form of any one of a plurality of visual marks, based on the verified qualification information included in the certificate information.

The user account may be created by subscribing to a service provided by the server. The service may include at least one of a social network service and an instant messaging service.

The adding of an interfacing object to the profile interface of the user account may further include: checking whether the user account is identity-verified in response to the request to display a profile certificate received from the user account; and requesting the user account to verify the identity when the user account is not identity-verified.

According to another aspect, a user profile providing method performed in a user terminal using a user account may include requesting a profile of another user account from a server; displaying a profile interface of another user account received from the server—the profile interface including an interfacing object indicating that another user account is identity-verified; requesting, from the server, certificate information of another user account in response to a user input related to the interfacing object; and displaying the certificate information of another user account received from the server, based on whether another user account is identity-verified. The certificate information may include at least one of verified real name information and verified qualification information.

The displaying of the certificate information may include: displaying the certificate information of another user account when another user account is identity-verified; and displaying limitingly the certificate information of another user account when another user account is not identity-verified.

According to another aspect, the server includes at least one processor configured to add an interfacing object indicating that the user account is identity-verified to a profile interface of the user account, in accordance with a user account which is identity-verified, provide the profile interface including the interfacing object to another user account, in response to a request of the profile received from another user account, check whether another user account is identity-verified in response to a request of certificate information of the user account received from another user account, and provide the certificate information to another user account based on whether another user account is identity-verified; and a memory configured to store the certificate information. The certificate information may include at least one of verified real name information and verified qualification information.

When the certificate information is provided, the processor may provide the certificate information to another user account when another user account is identity-verified and limits to provide the certificate information to another user account when another user account is not identity-verified.

When the certificate information is provided, the processor may activate a display function of the certificate information of the profile interface, based on a display setting of certificate information of the user account and display the certificate information through the profile interface to another user account which is identity-verified.

The interfacing object may be displayed through the profile interface as a visual mark.

BRIEF DESCRIPTION OF THE SEVERAL VIEWS OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
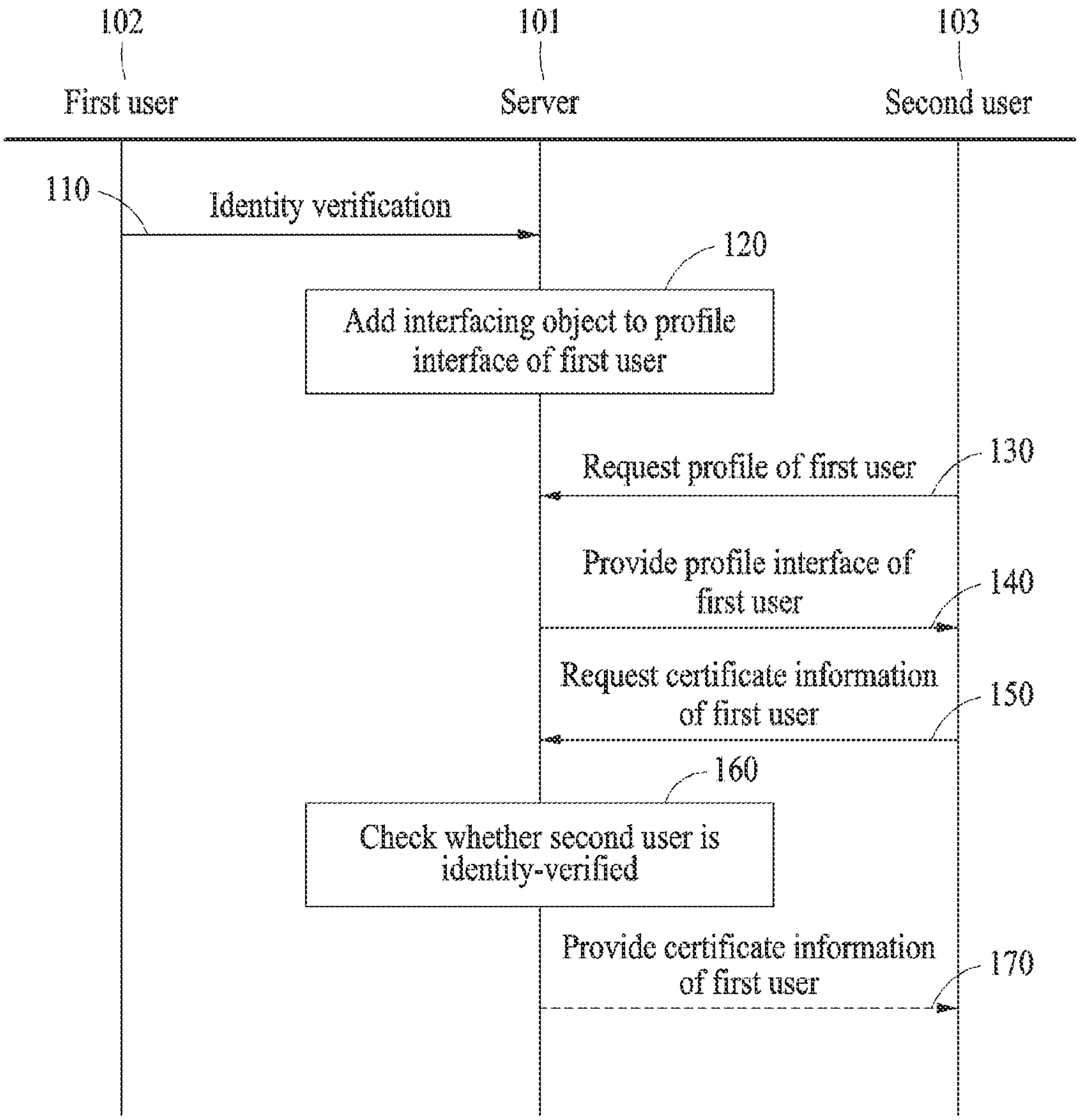
FIG. 1 is a view for explaining a user profile providing method performed in a server according to an example embodiment.

Specific structural or functional descriptions for example embodiments are provided for the purpose of illustration only and may be changed in various forms to be implemented. Accordingly, an actually implemented form is not limited only to the specific disclosed example embodiment and the scope of the present specification includes changes, equivalents, or substitutes included in a technical spirit described in the example embodiments.

Even though the terms such as first and second are used to describe various components, the terms should be interpreted only to distinguish one component from the other component. For example, a first component may be referred to as a second component, and similarly, a second component may be referred to as a first component.

It should be understood that, when it is described that an element is “connected” to another element, the element may be directly coupled or directly connected to the other element or coupled or connected to the other element through a third element and the singular expression includes the plural expression unless the context clearly means otherwise.

Hereinafter, example embodiments will be described in detail with reference to the accompanying drawings. In description with reference to accompanying drawings, the same components are denoted by the same reference numerals regardless of the reference numeral and a duplicated description thereof will be omitted.

FIG. 1 is a view for explaining a user profile providing method performed in a server according to an example embodiment.

Referring to FIG. 1, a server 101 according to an example embodiment may include a server which provides instant messaging services or social networking services. A first user 102 and a second user 103 may refer to a user terminal and/or a user account which is provided with a service from the server 101.

The user terminal is one of the electronic devices such as a computer, a portable computer, a wireless phone, a mobile phone, a smart phone, a personal digital assistant (PDA), and a web tablet and refers to all devices which are capable of installing and executing a service application related to the server 101. At this time, the user terminal may perform an overall operation for services such as the configuration of a service screen, data input, data transmission/reception, or data storage under the control of an application and for example, may be connected to the server 101 through an application.

The user account is generated by subscribing to a service provided by the server 101 and the server 101 may serve as a service platform which provides a service for communication between user accounts subscribed to the service, such as a social networking service or an instant messaging service. The user terminal is provided with the service using the user account so that the user account included in the following example embodiments may be interpreted to substantially refer to a user terminal.

The user may create a profile including identification information of the user, by means of the server 101. The profile corresponding to the user account may be displayed on a terminal, by means of a profile interface. The service according to the example embodiment may provide a profile with an improved utilization by diversifying a method of adding information to the profile and a method of displaying information included in the profile and the server 101 may perform a profile providing method therefor.

The profile providing method performed in the server 101 may include a step 120 of adding an interfacing object indicating that the user account is identity-verified in response to the identity-verified first user account to a profile interface of the first user account, a step 140 of providing a profile interface including an interfacing object to a second user account in response to a request 130 of a profile received from the second user account which is different from the first user account, a step 160 of checking whether the second user account is identity-verified in response to a request 150 of certificate information of the first user account received from the second user account, and a step 170 of providing the certificate information to another user account based on whether the second user account is identity-verified.

The user account subscribed to the service may perform identity verification (110) through the server 101. The identity verification is performed to check whether personal information input by a service user is service user's personal information, and for example, may include phone identity verification to confirm an input name and an actual owner of a resident registration number by sending a verification code to a phone number of the user's name, identity verification using official certificate, and the like.

The server 101 may acquire certificate information corresponding to the user account by means of the identity verification of the user account and the server 101 may store and manage the certificate information acquired so as to correspond to the user account. The certificate information includes verified personal information based on the identity verification, and for example, may include verified real name information and verified qualification information. The verified real name information corresponds to actual name information of a user who is verified through the identity verification. The verified qualification information is information for proving a position, a status, an ability of the user account, and may include, for example, a driver's license, a student ID, an employee ID, and other certifications.

The qualification information may be acquired from an issuing organization based on the certificate information of the user account. For example, the identity-verified user may request the server 101 to issue first qualification information of the user and the server 101 may acquire the first qualification information corresponding to the user account from a first issuing organization which gives the first qualification information, based on the verified real name information of the user account. The acquired qualification information may be stored in a memory managed by the server 101 so as to correspond to the user account.

According to the example embodiment, the server 101 may acquire the verified real name information of the first user account based on the identity verification of the first user account and acquire at least one verified qualification information corresponding to the first user account based on the verified real name information of the first user account.

The server 101 may add an interfacing object indicating that the user account is identity-verified in response to the identity-verified first user account to a profile interface of the first user account (120). The interfacing object is a configuration which is implemented to interact with the user in the interface and for example, may include a button implemented to switch to another screen by a click of the user. Hereinafter, the "interfacing object indicating that the user account is identity-verified" is simply referred to as an "interfacing object".

The server 101 may add an interfacing object indicating that the user account is identity-verified in response to a request to display the profile certificate received from the identity-verified first user account to a profile interface of the user account (120). A profile certificate is displayed by displaying the certificate to a profile of the identity-verified user account to be distinguished from a profile of another user account which is not identity-verified and the server 101 adds the interfacing object indicating that the identity is verified to the profile interface of the user account to display the profile certificate.

The user displays the profile certificate to inform another user that the user is an identity-verified user to utilize the profile certificate as a means of assisting identity certificate and qualification certificate.

The configuration of the profile interface including the interfacing object according to the example embodiment will be described in detail with reference to FIG. 3.

According to the example embodiment, even though the service may be implemented to allow only the identity-verified user account to request the server 101 to display the profile certificate, the service may be implemented to request the server 101 to display the profile certificate regardless of the identity verification. In this case, the operation method of the server 101 will be described with reference to FIG. 2.

Figure 2:
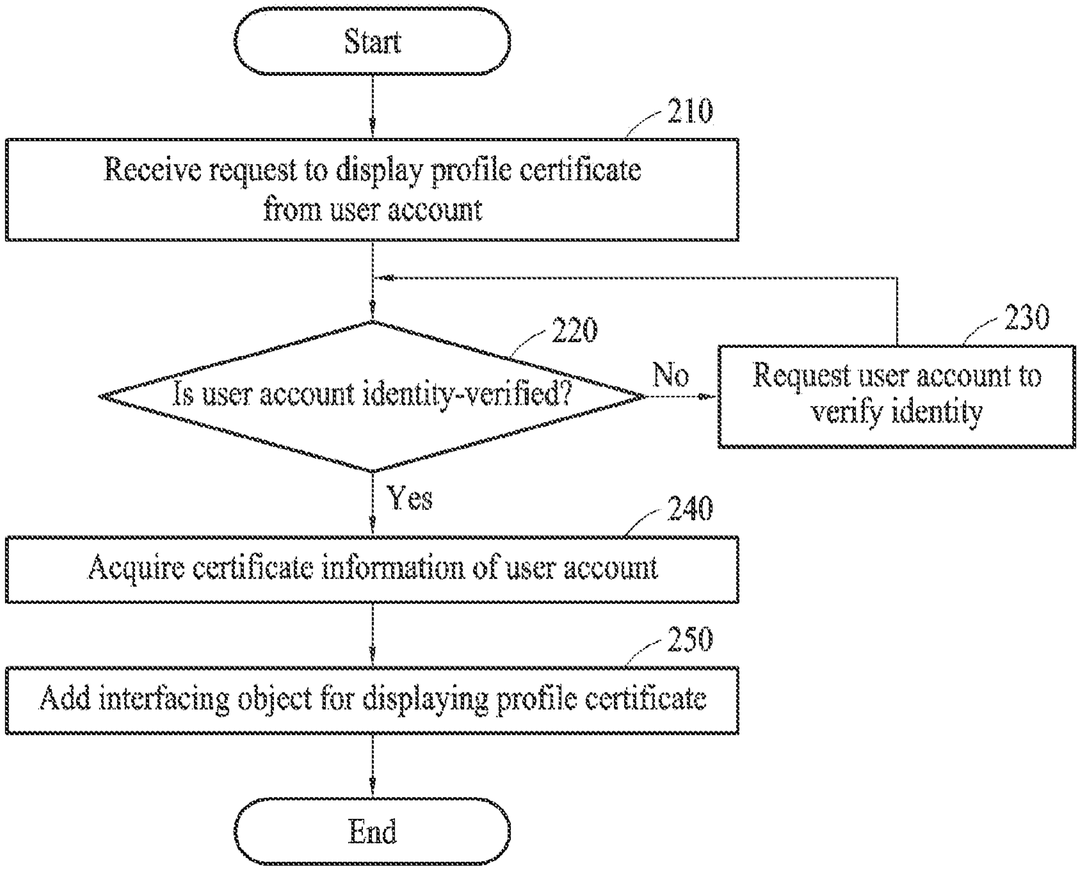
FIG. 2 is a flowchart of an operating method of a server to display profile certificate according to an example embodiment.

Referring to FIG. 2, an information processing method of a server 101 according to an example embodiment may include: a step 210 of receiving a request to display a profile certificate from a user account, a step 220 of checking whether the user account which requests to display the profile certificate is identity-verified, a step 230 of requesting identify verification for a user account if the user account which requests to display the profile certificate is not identity-verified, a step 240 of acquiring certificate information of the user account if the user account which requests to display the profile certificate is identity-verified, and a step 250 of adding an interfacing object for displaying the profile certificate.

In other words, the server 101 may be implemented to check whether the user account is identity-verified in response to the request to display the profile certificate received from the user account and request an account whose identity verification is not performed to perform the identity verification. When the identity verification is performed according to the request of identity verification, the server 101 may acquire certificate information of the user account through the identity verification and add the interfacing object to the profile interface to display the profile certificate of the identity-verified user account.

Referring to FIG. 1 again, the user account which is subscribed to the service may request the server 101 a profile of another user account subscribed to the service and receive the profile. When there is a request 130 of a profile corresponding to the first user account from the second user account, the server 101 may provide the profile interface of the first user account to the second user account. The profile corresponding to the identity-verified first user (102) account may include an interfacing object indicating that identity verification is done and the second user account may receive (140) the profile interface of the first user account including the interfacing object indicating that the identity verification is done, through the server 101.

According to an example embodiment, the request of a profile may include a request through a search based on verified qualification information included in the certificate information. The user may search for a user including specific qualification information through a search window of the service and the server 101 may provide a user profile including specific qualification information as a search result. When the server 101 receives the search request based on the qualification information included in the first user account from the second user account, in response to this, the server 101 may provide a profile of the first user account to the second user account. For example, when the second user account searches for the first qualification information, the server 101 may provide a profile of the first user account which possesses the first qualification information as a search result.

According to the example embodiment, in order to prevent the profile from being indiscriminately exposed to the other users through search, the user account may set a search permission option and the server 101 may provide the user profile based on the search permission option as a search result. The search permission option may include at least one of an option which allows the user account to be searched, an option which does not allow the user account to be searched, and an option which allows only an account related. to the user account to search for the user account. The account related to the user account may include an account which has a friend relationship with the user account, an account which is participating in the same chartroom as the user account, and an account which is subscribing to the same channel as the user account.

In other words, the server 101 may provide a profile interface of the first user account to the second user account based on the search permission option set so as to correspond to the first user account, in response to the second user account search. For example, when the option which allows the first user account to be searched is set, as a search result, the profile interface of the first user account may be provided. In contrast, when the option which does not allow the first user account to be searched is set, the profile interface of the first user account may not be provided as a search result. Alternatively, when the option which allows the first user account to be searched only by an account in a friend relationship is set, the profile interface of the first user account may be provided as a search result in response to the search request of the second user account in the friend relationship with the first user account.

The second user account may request (150) the server 101 the certification information of the first user account through the profile interface of the first user account. For example, the second user account may request the server 101 the certificate information of the first user account by clicking the interfacing object included in the profile interface of the first user account indicating that the identity is verified.

The server 101 may check (160) whether the second user account is identity-verified in response to the request 150 of certificate information of the first user account from the second user account. The server 101 may provide (170) the certificate information of the first user account to the second user account based on whether the second user account is identity-verified. When the second user account is an identity-verified account, the server 101 may provide (170) the certificate information of the first user account. Further, when the second user account is not an identity-verified account, the server may limit to provide the certificate information. When it is limited to provide the certificate information, the certificate information is not provided or only a part of the certificate information is provided.

According to the example embodiment, when the second user account is not an identity-verified account, the server 101 may request the second user account to verify the identity. When the identity is verified in the second user account according to the request of the server 101, the server 101 may provide certificate information including real name information and/or qualification information of the first user account to the second user account, through the profile interface of the first user account. A configuration of the profile interface on which the certificate information according to the example embodiment is displayed will be described below in more detail with reference to FIGS. 4A and 4B.

According to the example embodiment, the qualification information provided through the profile interface may correspond to valid qualification information. In other words, the server 101 may provide valid qualification information among qualification information stored so as to correspond to the first user account to the second user account through the profile interface. For example, when the validity period of the first qualification information among the qualification information stored in response to the first user account has expired, the first qualification information may not be provided.

According to the example embodiment, in addition to the validity of the qualification information, a condition for displaying qualification information may be further added. For example, the condition for displaying qualification information may include conditions of whether a user sets specific qualification information to be open and whether specific qualification information is allowed to be open to a plurality of unspecified users. The server 101 may provide qualification information to another user through the profile interface based on the condition for displaying qualification information.

According to the example embodiment, the first user account may set the display of the certification information through the profile interface. To be more specific, the first user account may set whether to activate a display function of the profile interface to display the certificate information to the second user 103. Further, the first user account may set to selectively display the certificate information to another user account. An example embodiment for a display setting of certificate information of the user account will be described below in more detail with reference to FIGS. 5A and 5B.

Figure 3:
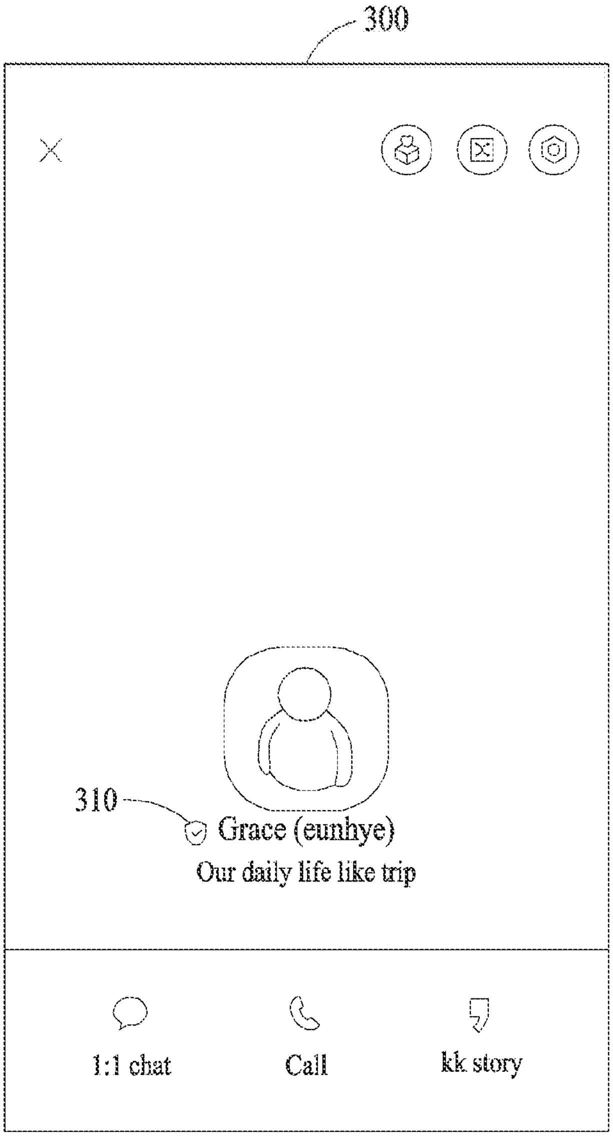
FIG. 3 is a view illustrating an example of a configuration of a profile interface including an interfacing object according to an example embodiment.

FIG. 3 is a view illustrating an example of a configuration of a profile interface including an interfacing object according to an example embodiment.

Referring to FIG. 3, a profile interface 300 of the identity-verified user account may include a configuration for displaying user information (for example, a profile photo or a profile name of the user account) generally included in a profile and include an interfacing object 310 indicating that the user account is identity-verified. The interfacing object 310 added to the profile interface of the identity-verified user account may correspond to a configuration of a profile interface for distinguishing the identity-verified user account from a user account which is not identity-verified.

The interfacing object 310 according to an example embodiment may be displayed through the profile interface 300 as a visual mark. In this case, it may be intuitively recognized that the first user account is an identity-verified user account through the interfacing object 310 displayed on the profile interface of the first user account including the interfacing object 310.

A type of the interfacing object 310 according to an example embodiment may be determined by one of a plurality of types, based on the qualification information included in the certificate information of the user account. For example, the type of interfacing object 310 may vary depending on the number of qualification information included in the user account and the type of the interfacing object 310 may vary depending on whether specific qualification information is included in the user account.

As illustrated in FIG. 3, when the interfacing object 310 is added to the profile interface as a visual mark, the type of the interfacing object may be determined by a shape or a color of the visual mark. In this case, a visual mark in which a shape, a color, or a combination thereof are differently configured according to the qualification information included in the user account may be displayed on the profile interface. For example, when n or more qualification information is included in the first user account, the interfacing object included in the profile interface of the first user account may be configured by a first color visual mark. When less than n qualification information is included in the second user account, the interfacing object included in the profile interface of the second user account may be configured by a second color visual mark. Further, when first qualification information is included in a third user account, the interfacing object included in the profile interface of the third user account may be configured by a third color visual mark.

As illustrated in FIG. 3, the interfacing object 310 may be visually displayed through the profile interface, but in the example embodiment, the interfacing object is not necessarily limited to be visually displayed and is implemented in various ways which distinguish from a profile interface to which the interfacing object is not added. For example, the interfacing object may be auditorily implemented to be output as a sound through the profile interface.

Figure 4A:
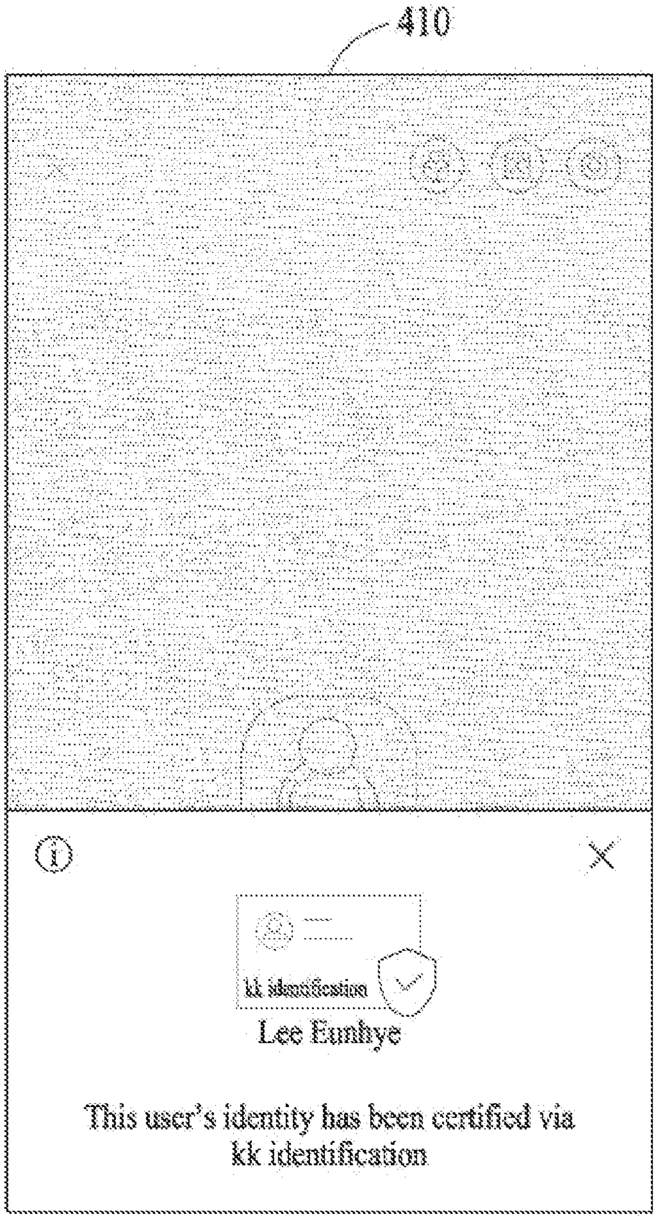
FIGS. 4A and 4B are views illustrating an example of a configuration of a profile interface in which certificate information is displayed according to an example embodiment.
Figure 4B:
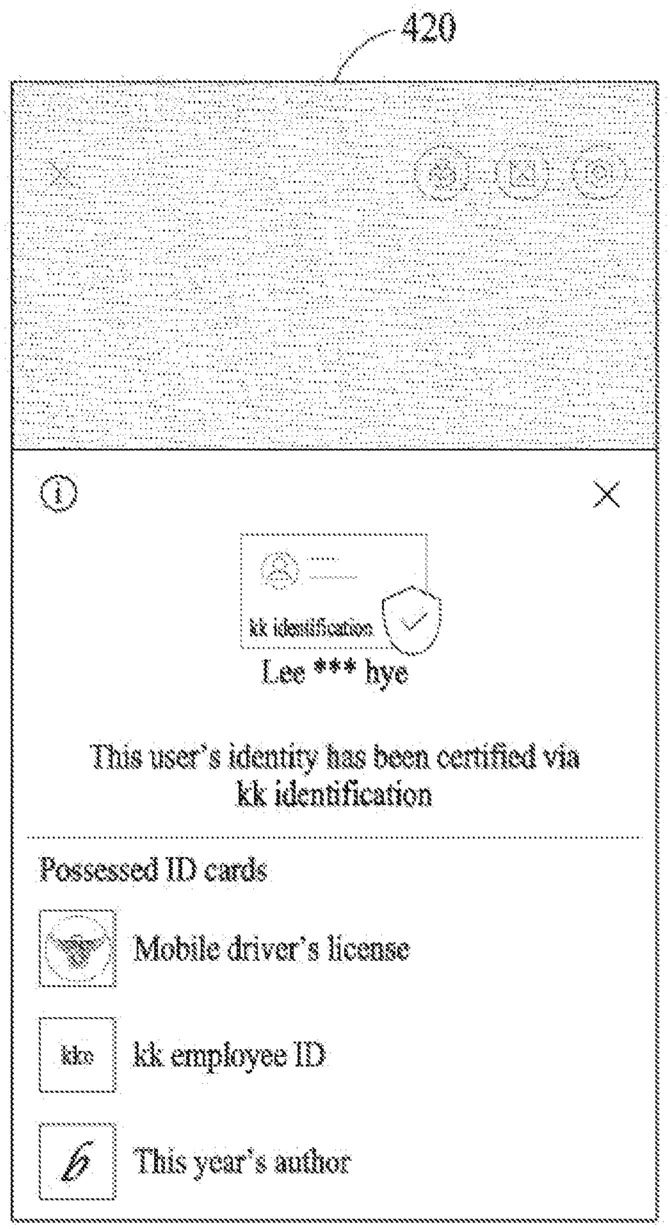

FIGS. 4A and 4B are views illustrating an example of a configuration of a profile interface according to an example embodiment in which certificate information is displayed.

Referring to FIGS. 4A and 4B, the certificate information may be displayed through profile interfaces 410 and 420. The certificate information may be displayed by interaction between interfacing objects included in the profile interfaces 410 and 420 and the user. For example, the user selects the interfacing object through the profile interface to display the certificate information.

Referring to FIG. 4A, the certificate information according to the example embodiment may include real name information. The real name information may be displayed on the profile interface 410 to allow the user to recognize an exact real name.

Referring to FIG. 4B, certificate information displayed through the profile interface 420 may include real name information and qualification information. The qualification information may be displayed as a list of a plurality of qualification information items stored so as to correspond to the user account and each qualification information item may be displayed as a certificate card. According to the example embodiment, only some qualification information items selected to be displayed according to a user's setting, among the plurality of qualification information items stored so as to correspond to the user account may be displayed through the profile interface. According to the example embodiment, the number of qualification information items to be displayed through the profile interface may be limited to a predetermined number.

According to the example embodiment, the real name information may be displayed by masking a part of the real name. A part of the real name is masked to be displayed so that it is possible to prevent the entire real name from being exposed to another user. Whether to display the entire verified real name or display a real name by masking a part of the real name may be determined based on the user's setting.

Figure 5A:
FIGS. 5A and 5B are views for explaining example embodiments for a display setting of certificate information of a user account.
Figure 5B:
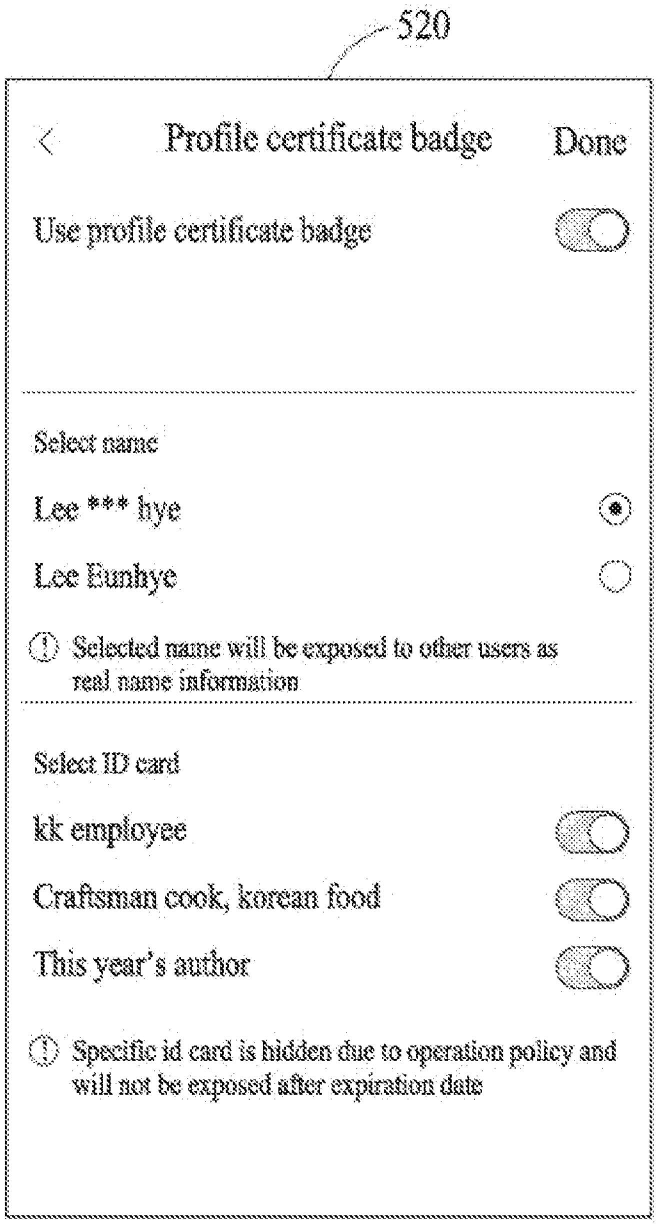

FIGS. 5A and 5B are views for explaining example embodiments for a display setting of certificate information of a user account.

A server according to an example embodiment may provide an interface for a display setting of certificate information to the user account. The identity-verified user account requests the server to display a profile certificate through an interface for a display setting of certificate information to activate a certificate information display function of the profile interface to display the certificate information in another user account.

For example, referring to FIG. 5A, the identity-verified first user account clicks the interfacing object 511 for a display setting of a profile certificate in a profile management interface 510 through a terminal to enter an interface 520 for a display setting of a profile certificate illustrated in FIG. 5B.

According to an example embodiment, the server which receives a request for displaying a profile certificate from the user account may check whether the user account is identity-verified. As a checking result, when the user account which is not identity-verified requests to display the profile certificate, the server may request the identity verification of the user account. For example, when the user account which is not identity-verified clicks the interfacing object 511 for a display setting of a profile certificate, the terminal of the user account may not directly enter the interface 520 for a display setting of a profile certificate illustrated in FIG. 5B, but may enter an interface for identity verification.

Referring to FIG. 5B, the first user account may activate a certificate information display function of the profile interface through the interface 520 for a display setting of a profile certificate. When the certificate information display function of the profile interface of the first user account is activated, the server may provide certificate information to the second user account which requests the certificate information of the first user account and is identity-verified, through the profile interface of the first user account.

The first user account may select real name information to be displayed in the second user account through an interface 520 for a display setting of a profile certificate. The entire real name may be displayed or a part of the real name is masked to be displayed on the profile interface to be provided to the second user account, depending on the setting of the first user account.

The first user account may set whether to display at least one verified qualification information acquired so as to correspond to the first user account through the interface 520 for a display setting of a profile certificate. When there is a plurality of qualification information acquired so as to correspond to the first user account, the first user account may set whether to display for each of the plurality of qualification information. The server may selectively provide the qualification information set by the first user account to be displayed, to the second user account, based on the display setting for each of the qualification information of the first user account.

The example embodiments described above may be implemented by a hardware component, a software component, and/or a combination of the hardware component and the software component. For example, the device, the method, and the components described in the example embodiments may be implemented, for example, using a general-purpose computer or a special purpose computer such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and a software application which is executed on the operating system. Further, the processing device may access, store, manipulate, process, and generate data in response to the execution of the software. For ease of understanding, it may be described that a single processing device is used, but those skilled in the art may understand that the processing device may include a plurality of processing elements and/or a plurality of types of the processing element. For example, the processing device may include a plurality of processors or include one processor and one controller. Further, another processing configuration such as a parallel processor may be allowed.

The software may include a computer program, a code, an instruction, or a combination of one or more of them and configure the processing device to be operated as desired or independently or collectively command the processing device. The software and/or data may be permanently or temporarily embodied in an arbitrary type of machine, component, physical device, virtual equipment, computer storage medium, or device, or signal wave to be transmitted to be interpreted by a processing device or provide command or data to the processing device. The software may be distributed on a computer system connected through a network to be stored or executed in a distributed manner. The software and data may be stored in a computer readable recording medium.

The method according to the example embodiment may be implemented as a program command which may be executed by various computers to be recorded in a computer readable medium. The computer readable medium may store the program instruction, a data file, or a data structure alone or in combination and the program instruction stored in the medium may be specifically designed and configured for the example embodiment or known to be available to those skilled in the art of computer software. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter.

The hardware device may operate as one or a plurality of software modules in order to perform the operation of the example embodiment and vice versa.

As described above, although example embodiments have been described by limited drawings, those skilled in the art may apply various technical modifications and changes based on the above description. For example, even when the above-described techniques are performed by different order from the described method and/or components such as systems, structures, devices, or circuits described above are coupled or combined in a different manner from the described method or replaced or substituted with other components or equivalents, the appropriate results can be achieved.

Therefore, other implements, other example embodiments, and equivalents to the claims are within the scope of the following claims.

The invention claimed is:

1. A user profile providing method performed in a server, the method comprising:

receiving personal information, from a terminal of a first user account, that indicates an identity of a user of the first user account;

in response to receiving, from the terminal of the first user account, a request for identity verification, identity-verifying the first user account based on the personal information;

adding information about an interfacing object indicating that the first user account is identity-verified to information about a profile interface of the first user account, based on identity verification of the first user account;

obtaining, in response to the identity verification of the first user account, qualification information for the first user account associated with an issuing organization, based on the verified personal information;

generating certificate information based on the verified personal information and the qualification information;

in response to receiving a request for the user profile of the first user account from a terminal of a second user account as part of providing at least one of a social network service or an instant messaging service, transmitting, to the terminal of the second user account, the information about the profile interface including the information about the interfacing object for display by the terminal of the second user account;

receiving from the terminal of the second user account a request for the certificate information of the first user account in response to user interaction with the interfacing object in the terminal of the second user account;

in response to receiving the request for certificate information of the first user account, checking whether the second user account is identity-verified; and transmitting the certificate information to the terminal of the second user account, in response to the second user account being identity-verified, for display by the terminal of the second user account.

2. The user profile providing method of claim 1 further includes:

prohibiting transmission of at least a portion of the certificate information to the terminal of the second user account, in response to the second user account not being identity-verified, for display by the terminal of the second user account.

3. The user profile providing method of claim 1, wherein the transmitting of the certificate information includes:

in response to the second user account being identity-verified, transmitting the certificate information to the terminal of the second user account based on configuration of display settings of the profile interface of the first user account received from the terminal of the first user account, wherein the configuration of display settings includes information for determining whether at least a portion of the certificate information is to be masked when displayed to a terminal of other user account, wherein the certificate information is displayed by the terminal of the second user account, with at least a portion masked according to the configuration of display settings.

4. The user profile providing method of claim 3, wherein the transmitted certificate information includes verified real name information corresponding to the first user account, with at least a portion of the verified real name information masked as indicated by the configuration.

5. The user profile providing method of claim 1, wherein obtaining the qualification information includes:

obtaining a plurality of qualification information items for the first user account, wherein the certificate information includes the verified personal information and the plurality of qualification information items, wherein the transmitting of the certificate information includes:

in response to the second user account being identity-verified, transmitting the certificate information to the terminal of the second user account based on configuration of display settings of the profile interface of the first user account received from the terminal of the first user account, wherein the configuration of display settings includes information for determining whether each of the plurality of qualification information items is to be displayed on a terminal of other user account.

6. The user profile providing method of claim 1, wherein the request for the user profile includes:

the request for the user profile by searching for the qualification information included in the certificate information, and the transmitting of the information about the profile interface includes:

transmitting the information about the profile interface to the terminal of the second user account, based on a search permission option set to correspond to the first user account, in response to the request for the user profile.

7. The user profile providing method of claim 6, wherein the search permission option includes: at least one of an option which allows the first user account to be searched, an option which does not allow the first user account to be searched, or and an option which allows the first user account to be searched only by an account related to the first user account.

8. The user profile providing method of claim 1, wherein the interfacing object is displayed through the profile interface in the form of a visual mark.

9. The user profile providing method of claim 1, wherein the interfacing object is displayed through the profile interface in the form of any one of a plurality of visual marks, based on the qualification information included in the certificate information.

10. The user profile providing method of claim 1, wherein the first user account is generated by subscribing to at least one of the social network service orand the instant messaging service.

11. A non-transitory computer readable medium storing a computer program having contents configured to cause one or more processors of a computing device to perform the user profile providing method of claim 1.

12. A user profile providing method performed in a terminal of a second user account, the method comprising:

transmitting a request for a user profile of a first user account to a server as part of consuming at least one of a social network service or an instant messaging service;

displaying a profile interface of the first user account based on information about the profile interface received from the server, the profile interface including an interfacing object indicating that the first user account is identity-verified;

receiving input representing a user interface interaction with the interfacing object in the displayed profile interface;

in response to receiving the input, transmitting a request to the server for certificate information of the first user account;

transmitting to the server identity verification information of the second user account, based on whether the second user account is identity-verified by verifying personal information of the second user account;

receiving certificate information of the first user account sent by the server based on (1) the request for certificate information of the first user account and (2) the identity verification information of the second user account; and displaying the certificate information of the first user account received from the server, wherein the certificate information is displayed on the terminal of the second user account based on configuration of display settings of the profile interface of the first user account, wherein the configuration of display settings includes information for determining whether at least a portion of the certificate information is to be displayed on a terminal of another user account.

13. The user profile providing method of claim 12, wherein the displaying of the certificate information includes:

displaying the certificate information of the first user account when the first user account is identity-verified; and displaying limitingly the certificate information of the first user account when the first user account is not identity-verified.

14. The user profile providing method of claim 12, wherein information included in the certificate information that is indicated to be masked by the configuration of display settings is not displayed on the terminal of the second user account.

15. A server, comprising:

at least one processor configured to:

receive personal information, from a terminal of a first user account, that indicates an identity of a user of the first user account;

in response to receiving, from the terminal of the first user account, a request for identity verification, identity-verify the first user account based on the personal information;

add information about an interfacing object indicating that the first user account is identity-verified to information about a profile interface of the first user account, based on identity verification of the first user account;

obtain, in response to the identity verification of the first user account, qualification information for the first user account associated with an issuing organization, based on the verified personal information;

generate certificate information based on the verified personal information and the qualification information;

in response to receiving a request for the user profile of the first user account from a terminal of a second user account as part of providing at least one of a social network service or an instant messaging service, transmit, to the terminal of the second user account, the information about the profile interface including the information about the interfacing object for display by the terminal of the second user account;

receive from the terminal of the second user account a request for the certificate information of the first user account in response to user interaction with the interfacing object in the terminal of the second user account;

in response to receiving the request for certificate information of the first user account, check whether the second user account is identity-verified; and transmit the certificate information to the terminal of the second user account, in response to the second user account being identity-verified, for display by the terminal of the second user account.

16. The server of claim 15, wherein the processor is further configured to:

prohibit transmission of at least a portion of the certificate information to the terminal of the second user account, in response to the second user account not being identity-verified, for display by the terminal of the second user account.

17. The server of claim 15, wherein when the certificate information is transmitted, the processor is configured to:

in response to the second user account being identity-verified, transmit the certificate information to the terminal of the second user account based on configuration of display settings of the profile interface of the first user account received from the terminal of the first user account, wherein the configuration of display settings includes information for determining whether at least a portion of the certificate information is to be masked when displayed to a terminal of other user account, wherein the certificate information is displayed by the terminal of the second user account, with at least a portion masked according to the configuration.

18. The server of claim 17, wherein the transmitted certificate information includes verified real name information corresponding to the first user account, with at least a portion of the verified real name information masked as indicated by the configuration.

19. The server of claim 15, wherein when the qualification information is obtained, the processor is configured to:

obtain a plurality of qualification information items for the first user account, wherein the certificate information includes the verified personal information and the plurality of qualification information items, wherein when the certificate information is transmitted, the processor is configured to:

in response to the second user account being identity-verified, transmit the certificate information to the terminal of the second user account based on configuration of display settings of the profile interface of the first user account received from the terminal of the first user account, wherein the configuration of display settings includes information for setting whether each of the plurality of qualification information items is to be displayed on a terminal of other user account.

20. The server of claim 15, wherein the request for the user profile includes:

the request for the user profile by searching for the qualification information included in the certificate information, and when the information about the profile interface is transmitted, the processor is configured to:

transmit the information about the profile interface to the terminal of the second user account, based on a search permission option set to correspond to the first user account, in response to the request for the user profile.

* * * * *